(12) United States Patent
Kerr et al.

(10) Patent No.: US 6,716,941 B2
(45) Date of Patent: Apr. 6, 2004

(54) HIGH SOLIDS ETHYLENE-VINYL ACETATE LATEX

(75) Inventors: John C. H. Kerr, South Croydon (GB); Alistair J. McLennan, Wallington (GB); Robert N. Mitchell, Horsham (GB); Caroline S. Pattenden, Ashtead (GB)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 128 days.

(21) Appl. No.: 09/917,155

(22) Filed: Jul. 27, 2001

(65) Prior Publication Data

US 2003/0040558 A1 Feb. 27, 2003

(51) Int. Cl.$^7$ .................................................. C08F 2/20
(52) U.S. Cl. .................... 526/202; 526/210; 526/318.4; 526/348; 524/503; 524/459; 525/243
(58) Field of Search ................ 524/503, 459; 526/202, 210, 318.4, 348; 525/243

(56) References Cited

U.S. PATENT DOCUMENTS

| | | | |
|---|---|---|---|
| 4,921,898 A | 5/1990 | Lenney et al. | 524/459 |
| 5,070,134 A | 12/1991 | Oyamada et al. | 524/503 |
| 5,629,370 A | 5/1997 | Freidzon | 524/503 |
| 5,936,020 A | 8/1999 | Freidzon | 524/377 |
| 5,939,505 A | 8/1999 | Kukkala | 526/202 |
| 6,001,916 A | 12/1999 | Walker et al. | 524/459 |
| 2002/0032268 A1 * | 3/2002 | Weitzel | 524/460 |

FOREIGN PATENT DOCUMENTS

| EP | 1 067 147 | 1/2001 | ......... C08F/218/08 |

* cited by examiner

Primary Examiner—David W. Wu
Assistant Examiner—Satya B Sastri
(74) Attorney, Agent, or Firm—Charles W. Almer; Thomas F. Roland

(57) ABSTRACT

The present invention is directed to an ethylene-vinyl acetate dispersion and a process for making the dispersion by polymerizing a monomer mixture having vinyl acetate and ethylene in a batch process, in the presence of a stabilizing system of polyvinyl alcohol and without added surfactants, to form an ethylene-vinyl acetate polymer dispersion. The copolymer dispersion has a solids level of greater than 65 percent by weight, and a viscosity of less than 5000 mPa·s when measured at 65 percent solids at 25° C. The dispersion can be dried to form a redispersible powder. Both the dispersion and powder are useful in adhesive and coating formulations.

10 Claims, No Drawings

HIGH SOLIDS ETHYLENE-VINYL ACETATE LATEX

FIELD OF THE INVENTION

This invention relates to a high solids ethylene-vinyl acetate dispersion and a process for producing such a dispersion by batch polymerization of a monomer mixture having vinyl acetate and ethylene, in the presence of a stabilizing system of polyvinyl alcohol without additional surfactants. The dispersion has a solids level of greater than 65 percent by weight, and a viscosity of less than 5000 mPa·s when measured at 65 percent solids at 25° C. The dispersion can be dried to form a redispersible powder. Both the dispersion and powder are useful in adhesive, coating and cementitious formulations.

BACKGROUND OF THE INVENTION

Ethylene-vinyl acetate dispersions, and powders produced by drying these dispersions, are widely used in adhesive, coating and cementitious formulations. High solids dispersions are of special interest due to favorable economics through increasing the reactor efficiency. High solid dispersions that will be spray dried benefit from having less water to remove, increasing the efficiency of the spray dryer in both throughput and energy savings. A high solids dispersion must have a low enough viscosity for practical use.

U.S. Pat. No. 4,921,898; 5,070,134; 5,629,370; 5,936.020; 5,939,505; and 6,001,916 all disclose ethylene-vinyl acetate dispersions having a solids level of greater than 65 percent. These dispersions are produced in a batch reactor, and using a stabilizer system of polyvinyl alcohol and a surfactant. The presence of a surfactant in the dispersion negatively affects water-resistance, spray-drying, and redispersibility of polymer powders.

EP 1067147 discloses a continuous process for the production of a high solids ethylene-vinyl acetate dispersion using low molecular weight polyvinyl alcohol as the emulsifying agent without the use of a surfactant, producing an dispersion having greater than 65 percent solids and a viscosity of 1000 to 3000 cps at 25° C. The application cites that conventional batch processes have not been adapted to make high solids vinyl acetate/ethylene dispersions without a surfactant.

Surprisingly it has been found that an ethylene-vinyl acetate dispersion having a solids level of greater than 65 percent by weight, and a viscosity at 65 percent by weight solids of less than 5000 mPa·s., can be produced in a batch process using polyvinyl alcohol as the stabilizer, without additional surfactants.

SUMMARY OF THE INVENTION

The present invention is directed to a polymer composition comprising an ethylene-vinyl acetate polymer dispersion stabilized with polyvinyl alcohol, wherein said dispersion has a solids level of greater than 65 percent by weight, and wherein said dispersion has a bimodal particle size distribution.

The invention is also directed to a process for forming an ethylene-vinyl acetate polymer dispersion comprising polymerizing a monomer mixture comprising vinyl acetate and ethylene in a batch process, in the presence of a stabilizing system consisting of polyvinyl alcohol, to form an ethylene-vinyl acetate polymer dispersion, wherein said copolymer dispersion has a solids level of greater than 65 percent by weight, and a viscosity of less than 5000 mPa·s when measured at 65 percent solids at 25° C.

The invention is further directed to process for producing a redispersible polymer powder comprising polymerizing a monomer mixture comprising vinyl acetate and ethylene in a batch process, in the presence of a stabilizing system consisting of polyvinyl alcohol, to form an ethylene-vinyl acetate polymer dispersion; and drying said polymer dispersion to form a redispersible polymer powder, wherein said copolymer dispersion has a solids level of greater than 65 percent by weight, and a viscosity of less than 5000 mPa·s.

The invention is also directed to the use of the high solids dispersion and redispersible powder in adhesives, coatings and cementitious formulations.

DETAILED DESCRIPTION OF THE INVENTION

The dispersion polymer of the present invention is formed in a batch free radical polymerization of vinyl acetate, ethylene, and optionally other comonomers including functional monomers, in the presence of a polyvinyl alcohol stabilizing system. Water forms the continuous phase, with polymer particles forming the dispersed phase.

Vinyl acetate and ethylene monomers are polymerized to form the dispersion polymer. In general, the final polymer contains from 75 to 99 percent by weight of vinyl acetate, and from 1 to 25 percent by weight of ethene. Preferably the level of vinyl acetate is from 85 to 95 percent by weight and the level of ethylene incorporated is from 5 to 15 percent by weight.

In addition to vinyl acetate and ethylene, one or more other ethylenically unsaturated monomers may also be present in the monomer mixture at up to 15 percent by weight, preferably from 5 to 10 percent by weight of the total polymer solids. Examples of said comonomers include, but are not limited to, comonomers conventionally used in compositions with ethylene and vinyl esters such as acrylates and maleates, e.g. butyl acrylate, and 2-ethylhexyl acrylate. Functional monomers may also be included at up to 10 percent by weight, and preferably from 1 to 5 percent by weight. Examples of suitable functional monomers are carboxylic acids, such as acrylic, methacrylic and maleic acid as well as hydroxyl and amide functional monomers, e.g. hydroxyethylacrylate, hydroxypropylacrylate, acrylamide, N-vinyl formamide, N-vinyl acetamide and the like. Crosslinking monomers can also be present, such as N-methylol acrylamide, and the n-alkyl esters thereof.

Additionally, certain copolymerizable monomers that assist in the stability of the copolymer dispersion, e.g., vinyl sulfonic acid and 2-acrylamido-2-methylpropane sulfonic acid or their salts may be used herein as latex stabilizers. If present, these stabilizers are added in amounts of from about 0.2 to 1 percent by weight of the monomer mixture.

The initiator is any free radical initiator, or initiator system known in the art. Suitable as polymerization initiators are the water-soluble free-radical-formers generally used in emulsion polymerization, such as hydrogen peroxide, sodium persulfate, potassium persulfate and ammonium persulfate, as well as t-butyl hydroperoxide, in amounts of between 0.01 and 3 percent by weight, preferably 0.1 and 1 percent by weight based on the total amount of the polymer dispersion. They can be used alone or together with reducing agents such as sodium formaldehydesulfoxylate, iron-II-salts, sodium dithionite, sodium hydrogen sulfite, sodium sulfite, sodium thiosulfate, ascorbic acid, erythorbic acid as redox catalysts in amounts of 0.01 to 3 percent by weight, preferably 0.1 to 1 percent by weight, based on the total amount of the polymer dispersion. The free-radical-formers can be charged in the aqueous emulsifier solution or be added during the polymerization in doses. Oil soluble initiators such as t-butyl hydrogen peroxide are preferred.

The stabilizing system of the present invention is low molecular weight polyvinyl alcohol. The polyvinyl alcohol is preferably partially hydrolyzed polyvinyl acetate and is used in amounts of 1 to 15 percent by weight, preferably 4 to 10 percent by weight, based on the weight of the polymer solids. Generally, the degree of hydrolysis will vary from 50 to 99 percent, preferably from 80 to 99 percent of the acetate groups. The polyvinyl alcohol should also exhibit a viscosity of about 2 to 45 mPa·s., preferably 3 to 30 mPa·s, and most preferably 3 to 10 mPa·s for a 4 weight percent aqueous solution at 20° C. as determined by the Hoeppler falling ball method. Exemplary of the polyvinyl alcohol component include AIRVOL A205, a low molecular weight, 87 to 89 percent hydrolyzed polyvinyl acetate; and AIRVOL A203, a low molecular weight, 87 to 89 percent hydrolyzed polyvinyl acetate, which are marketed by Air Products Corporation. Blends of various polyvinyl alcohols may also be used in order to increase the water resistance of the resultant powder and can include 92 to 99 percent hydrolyzed polyvinylalcohol, such as AIRVOL Al 03 from Air Products or RS 105 from Kuraray.

The stabilizing system of the present invention could optionally include protective colloids in addition to the polyvinyl alcohol. Examples of useful colloids include, but are not limited to, polyethylene glycol, cellulosics, and polyvinyl pyrrolidone. The stabilizing system is free of surfactants.

The polymerization process is a batch process, involving a single reactor with all monomer added prior to commencing the reaction. In general, the process includes charging the reactor initially with vinyl acetate, ethylene, water, polyvinyl alcohol and any other suitable components. This initial charge represents 100 percent of the total monomer charge. The ingredients may be added in any order without affecting the resultant dispersion. The reactor is then heated to from 40 to 60° C., preferably about 50° C. The reactor is agitated by any suitable means to facilitate dissolution of the ethylene. A portion of the initiator is added to the initial charge, with the remainder added gradually during the reaction to maintain the reaction. Generally the reaction will last several hours, preferably up to 10 hours and most preferably from 1 to 4 hours.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, including mercaptans such as mercaptoacetic acid and mercaptoethanol; aldehydes; chloroform; methylene chloride and trichloroethylene, may also be added.

It has been found that a seeded process is beneficial, but not essential. A seeded process involves the addition of from 0.01 to 10 percent by weight of a seed polymer, based on the weight of the final dispersion, to the reactor charge. Preferably the seed is an ethylene vinyl acetate latex polymer stabilized with polyvinyl alcohol, as known in the art. Most preferably the seed has a fine unimodal particle size distribution. An example of such a polymer is VINAMUL V3265, by National Starch and Chemical.

The reaction is generally continued until the residual monomer content is below about 1 percent The reaction product is cooled slightly and further initiator is added in order to reduce the residual monomer below 1000 ppm. The completed reaction product is then allowed to cool to about room temperature, while sealed from the atmosphere. After degassing, the pH may then be suitably adjusted to ensure maximum stability. Other adjustments or additions may optionally be made at this time, as desired.

The dispersion produced has a high solids level, without the need for an additional concentration step. By high solids, as used herein, is meant that the polymer particles are present in the dispersion at a level of 65 percent by weight or greater, preferably 67 percent by weight or greater, and most preferably greater than 68 percent, based on the dispersion.

The high solids dispersion of the present invention has a viscosity of a level to facilitate transport and also useful in a spray dryer, without further dilution. Preferably the viscosity of the high-solids dispersion is less than 5,000 mPa·s., and most preferably less than 3,000 mPas, when measured at 65 percent solids at 25° C.

Dispersions formed from the present invention have a bimodal particle size distribution. While not being bound by any theory, it is believed that the bimodal distribution may be due to the formation of both emulsion and suspension polymers with the reaction system. Particle sizes of the dispersion particles from the process are illustrated in FIG. 1, and consist of a peak with a maximum between 0.2 and 0.5 microns, and a peak with a maximum between 3 and 6 microns.

The dispersion formed in the present invention may be used in the aqueous form, or may be dried to form a redispersible powder. Drying is done by any means known in the art, such as freeze drying, drum drying, fluidized bed, or spray drying. A preferred method is by spray drying under conditions known in the art. These conditions are illustrated in the Examples. The high solids level of the dispersions is advantageous in the drying procedure, since less water must be removed, requiring less time and expense.

Since the dispersions of the present invention are stabilized without the use of surfactants, water-resistance properties are not adversely affected. This makes these dispersions, or powders formed from the dispersions with excellent water resistant properties. The absence of a surfactant also improves both the spray-drying, and the redispersibility of the powder.

Typical applications for the dispersion include, but are not limited to, to self-leveling floor screeds, ceramic tile adhesives, packaging and converting adhesive applications, and coatings. Typical applications for the powder include, but are not limited to adhesives, cement additives, and cementitious, gypsum based, gypsum-free, and cement-free mortars. These mortars may contain ingredients, such as for example: quartz sand, calcium and magnesium carbonates, silicates, cellulose, calcium oxide, other minerals, or mixtures thereof The following examples are presented to further illustrate and explain the present invention and should not be taken as limiting in any regard.

EXAMPLE 1

An aqueous solution was prepared by the addition of 378 g AIRVOL 203 (Air Products) to 1260 g of cold demonized water whilst stirring. The mixture was heated at 85° C. for 1 hour. Once cool, 1 g of sodium bicarbonate, 2 g of formosul (sodium formaldehyde sulphoxylate), 21 g of 1% aqueous solution of ferrous sulphate, 21 g of 1 % aqueous solution of versene (ETDA complexing agent) and 341 g of 25–1808, National Starch and Chemical Company, an ethylene vinyl acetate seed latex (55% solids, 12/88 ethylene/vinyl acetate stabilized with 5 parts polyvinyl alcohol) was added. The solution was stirred and the pH adjusted to 3.9–4.1 with phosphoric acid. It was then charged to a 12 litre stainless steel reaction vessel and the inlet port flushed with 200 g of deionised water.

The reaction vessel was purged by pressurizing to 7 bar with nitrogen twice and once with ethylene. The vessel was vented between each purge.

The reaction vessel was then evacuated and 5764 g of vinyl acetate was charged, followed by 630 g of ethylene. Agitation commenced at 450 rpm and the mixture was pre-emulsified for 10 minutes before the temperature was increased to 50° C. When the temperature was constant at 50° C., continuous additions of a solution of 20 g of tertiary butyl hydroperoxide in 600 g of deionised water, and a solution of 10 g of formosul and 1.6 of sodium bicarbonate in 600 g of deionised water were commenced to last 3.5 hours.

After a 2° C. exotherm the external temperature was increased to 60° C. The batch temperature was allowed to increase to above 85° C. not exceeding 110° C. After the initial exotherm the reaction temperature was maintained at 85° C.

Once the continuous additions were complete the batch was cooled to 60° C. and a solution of 10 g of tertiary butyl hydroperoxide in 60 g of deionised water was added over 10 minutes. The reaction was held for 10 minutes before a solution of 9 g of formsul in 60 g of deionised water was added over 10 minutes.

The reactor was cooled and the contents discharged to a de-gassing vessel containing a solution of 2 g Bevaloid 681 in 20 g of deionised water. The vessel was left overnight to degas then the resultant dispersion was filtered through a 120 mesh.

The resultant polymer had a solids content of 68.59%, viscosity of 2280 mPa·s, and a glass transition temperature of 17.9° C. The ethylene content by IR was recorded as 10%.

EXAMPLE 2

This example was prepared using the same method as described in Example 1, but the distribution of water was modified. The initial reactor charge had 1860 g of deionized water, while the initiator solutions contained 353 g of deionized water each. The resultant polymer had a solids content of 68.25%, a viscosity of 2550 mPa·s, and a glass transition temperature of 16.3° C.

EXAMPLE 3

Example 3 was synthesized as described in Example 1, but no seed latex was introduced into the water phase. The resultant polymer had a solids content of 68.84%, a viscosity of 3450 mPa·s, and a Tg of 11.2° C.

EXAMPLE 4

This sample was prepared in the same way as Example 1, the difference in this case was that ferric chloride was used to catalyze the redox reaction rather than the ferrous sulphate/versene pair. The resultant polymer had a solids content of 68.09%, a viscosity of 2790 mPa·s·s, and a Tg of 12.9° C.

EXAMPLE 5

This examples was synthesized as outlined in Example 1, the difference was the seed latex introduced into the water phase. VINAMUL 3265 (National Starch & Chemical) is an EVA (17/83) stabilized with 5 parts of PVOH. The resultant polymer had a solids content of 67.3%, a viscosity of 3690 mPa·s, and a Tg of 14.4° C.

EXAMPLE 6

This example was made using the process outlined in Example 1, except that 8% AIRVOL 203 based on monomer weight was used for stabilization. The resultant polymer had a solids content of 65.22%, a viscosity of 2270 mPa·s, and a Tg of 13.13° C.

EXAMPLE 7

This example was made using the process outlined in Example 2, except that 10% AIRVOL 203 based on monomer weight was used for stabilization. The resultant polymer had a solids content of 65.0%, a viscosity of 3200 mPa·s, and a Tg of 16.76° C.

EXAMPLE 8

This example was prepared in the same way as Example 6, using AIRVOL 502 instead of AIRVOL 203. The resultant polymer had a solids content of 68.35%, a viscosity of 2990 mPA·s, and a Tg of 16.3° C.

EXAMPLE 9

This example was prepared in the same way as Example 8, with 2% AIRVOL A102 and 6% AIRVOL 203 based on monomer weight used for stabilization. The resultant polymer had a solids content of 67.97%, a viscosity of 6600 mPa·s, but diluted to a viscosity of 3730 mPa·s at 65.5% solids, and a Tg of 13.13° C.

EXAMPLE 10

This example was prepared using the process outlined in Example 8, with 6% AIRVOL 502 and 2% GOHSENOL AL06 based on monomer weight used for stabilization. The resultant polymer had a solids content of 67.31 %, a viscosity of 5420 mPa·s, which diluted to a viscosity of 4500 mPa·s at 66.75% solids, and a Tg of 13.13° C.

EXAMPLE 11

Example 11 was prepared using the same method as Example 2, with 315 g VeoVa 10 (Shell Chemicals) substituted for 315 g of vinyl acetate. The resultant polymer had a solids content of 68.1%, a viscosity of 4160 mPa·s, and a Tg of 14.8° C.

EXAMPLE 12

Example 12 was prepared using the same method as Example 2, with 630 g VeoVa 10 substituted for 630 g of vinyl acetate. The resultant polymer had a solids content of 67.74%, a viscosity of 6000 mPa·s. This diluted to a viscosity of 3520 mPa·s at 66.86% solids content. The Tg was 7.6° C.

EXAMPLE 13

Example 13 was prepared using the same method as Example 2, with 315 g 2-EHA substituted for 315 g of vinyl acetate. The resultant polymer had a solids content of 67.1%, a viscosity of 1850 mPa·s, and a Tg of 8° C.

EXAMPLE 14

Example 14 was prepared using the same method as Example 1, but the stirrer speed was increased to 580 rpm. The resultant polymer had a solids content of 68.26%, a viscosity of 3900 mPa·s, and a Tg of 16.0° C.

EXAMPLE 15

Example 15 was prepared using the same ingredients as Example 1, however the order of addition was modified so the vinyl acetate was added at room temperature, agitation was commenced and the water phase was added. After the water phase was loaded, the temperature was raised prior to adding the initiators. The resultant polymer had a solids content of 67.64%, a viscosity of 3110 mPa·s, and a Tg of 16.3° C.

EXAMPLE 16

The dispersion from Example 14 was spray dried in the typical manner yielding a free flowing redispersible powder. The powder was compared with a standard EVA redispersible powder in floor screeds and ceramic tile adhesives and comparable properties were obtained regarding spread, surface hardness, mortar workability, and pot life.

These results indicate that dispersions made according to the invention can be spray dried and redispersed in a manner similar to current system, but with less energy due to the lower amount of water to be evaporated.

What is claimed is:

1. A process for forming an ethylene-vinyl acetate polymer dispersion comprising polymerizing a monomer mixture comprising vinyl acetate and ethylene in a batch process, in the presence of a surfactant-free stabilizing system consisting of polyvinyl alcohol, and in the presence of from 0 to 10 percent by weight of a seed polymer based on the weight of the dispersion, to form an ethylene-vinyl acetate polymer dispersion, wherein said copolymer dispersion has a solids level of greater than 65 percent by weight, and a viscosity of less than 5000 mPa·s when measured at 55 percent solids at 25° C., and wherein all monomer, polyvinyl alcohol, and seed polymer is in the initial reactor charge.

2. The process of claim 1 wherein said ethylene-vinyl acetate polymer dispersion comprises from 75 to 99 percent by weight vinyl acetate units and from 1 to 25 percent by weight of ethylene units, based on polymer solids.

3. The process of claim 1 wherein said polyvinyl alcohol is present at from 1 to 15 percent, based on the weight of the polymer solids.

4. The process of claim 3 wherein said polyvinyl alcohol is present at from 4 to 10 percent, based on the weight of the polymer solids.

5. The process of claim 1 wherein said polymer dispersion has a bimodal particle size distribution.

6. The process of claim 1 wherein all monomer is added prior to commencing the reaction.

7. The process of claim 1 wherein said monomer mixture further comprises up to 15 percent by weight of at least one, other monomer.

8. The process of claim 1 wherein said monomer mixture further comprises up to 10 percent by weight of at least one functional monomer.

9. The process of claim 1 comprising 0.01 to 10 percent of a seed polymer to the initial monomer charge, based on the weight of the dispersion.

10. A process for producing a redispersible polymer powder comprising a) polymerizing a monomer mixture comprising vinyl acetate and ethylene, in the presence of from 0 to 10 percent by weight of seed polymer based on the weight of the dispersion, in a batch process, in the presence of a surfactant-free stabilizing system consisting of polyvinyl alcohol, to form an ethylene-vinyl acetate polymer dispersion; and b) drying said polymer dispersion to form a redispersible polymer powder, wherein said copolymer dispersion has a solids level of greater than 65 percent by weight, and a viscosity of less than 5000 mPa·s, wherein all monomer, polyvinyl, alcohol, and seed polymer is in the initial reactor charge.

* * * * *